3,454,683
PROCESS FOR THE MANUFACTURE OF NEUTRAL
POLYPHOSPHORIC ESTER ANHYDRIDES
Klaus-Dieter Kampe and Edgar Fischer, Frankfurt
am Main, Germany, assignors to Farbwerke
Hoechst Aktiengesellschaft, vormals Meister Lucius
& Bruning, Frankfurt am Main, Germany, a corporation of Germany
No Drawing. Filed Oct. 23, 1965, Ser. No. 504,185
Claims priority, application Germany, Oct. 28, 1964,
F 44,325
Int. Cl. C07f 9/32, 9/40; C07d 105/02
U.S. Cl. 260—988                                 5 Claims

ABSTRACT OF THE DISCLOSURE

A process has been provided for the manufacturer of neutral polyphosphoric ester anhydrides which comprises reacting with phosphorus pentoxide, at a temperature within the range of from $-78°$ to $+140°$ C., a phosphorus compound or a mixture of phosphorous compounds of the formula

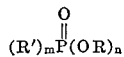

wherein $m$ and $n$ each represents the whole number 1 or 2 and the sum of $n+m$ is 3, R' represents saturated, unsaturated, oxalkylated or halogenated aliphatic, cycloaliphatic or aromatic radicals each containing 1 to 10 carbon atoms, and R represents saturated and halogenated aliphatic radicals each containing 1 to 5 carbon atoms, said phosphorus compound and phosphorus pentoxide being in a molar ratio of 0.01 to 20 moles:1 mole, respectively. Representative compounds suitable for use in the process are chloromethyl phosphonic acid dimethyl ester or dimethyl phosphinic acid methyl ester. The compounds are catalysts in proton-catalyzed reactions.

---

The present invention relates to a process for the manufacture of neutral polyphosphoric ester anhydrides.

It is known that neutral polyphosphoric acid esters can be prepared by reacting alkyl esters or aryl esters of phosphoric acid with phosphorus pentoxide whereby oleaginous compounds are formed which cannot be distilled. It is disadvantageous that the unreacted starting products can be separated from the reaction product only with difficulty and at elevated temperature. At temperatures above 120° C. neutral polyphosphoric acid esters, with the exception of methyl esters, commence to decompose. Consequently, this process is not very well suited for the preparation of polyphosphoric acid esters which are free from phosphate, phosphorus or polyphosphoric acid. It is, moreover, known that polyphosphoric acid esters, that is to say tetrameric cyclic polyphosphoric acid esters, are formed in the reaction of phosphorus pentoxide with diethyl ether in chloroform. It is true that a defined mixture of two known compounds is formed when using this method, however, relatively long periods of time are necessary for the conversion, which is inconvenient especially when preparing large amounts of this polyphosphoric acid ester.

This reaction, moreover, depends to a great extent on the quality of the phosphorus pentoxide. Only certain batches thereof can be used for the preparation of active colorless polyphosphoric acid esters.

Now we have found that neutral polyphosphoric ester anhydrides can be prepared advantageously by reacting phosphorus compounds or mixtures of phosphorus compounds of the formula

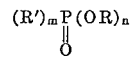

wherein $m$ and $n$ each represents the whole number 1 or 2 and the sum of $n+m$ is 3, R' represents saturated, unsaturated, oxalkylated or halogenated aliphatic, cycloaliphatic or aromatic radicals each containing 1 to 10 carbon atoms, and R represents saturated and halogenated aliphatic radicals each containing 1 to 5 carbon atoms with phosphorus pentoxide, if necessary in the presence of a solvent at a temperature within the range of from $-78°$ to $+140°$ C.

Suitable phosphorus compounds are, for example,

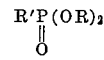

and

in which R and R' have the above meaning. The oxalkylated aliphatic radicals are preferably methoxy-, ethoxy-, propoxy- and butoxy alkyl radicals, while the halogenated aliphatic radicals are monohalogenated alkyls.

Especially suitable phosphorus compounds are, for example, phosphonic acid esters of the formula

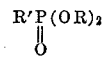

in which R and R' represent methyl- or ethyl groups, or mixtures of these compounds.

The phosphorus compounds are added, either in a pure state or in the presence of one of the solvents enumerated below, to pure phosphorus pentoxide or to mixtures thereof with the solvents enumerated below at a temperature within the range of from $-78°$ to $+140°$ C., preferably within the range of from $-30°$ to $+100°$ C., advantageously in an atmosphere of inert gas, for example nitrogen, and with almost complete exclusion of moisture. The reaction mixtures prepared in this manner are stirred or thoroughly mixed within the limits of the aforementioned temperature range.

The reaction periods may vary from 10 minutes to 24 hours and are different as regards the individual phosphorus compounds. The phosphorus compounds are suitably applied in a molar ratio within the range of from 0.01 to 20 moles (preferably in the molar quantities indicated in the table hereunder) per mole of phophorus pentoxide. The first column of the table contains the respective type of compound of the phosphorus compound, in which case the above-mentioned radicals may represent R and R'. In the second column there is listed the range of the molar quantities of the phosphorus compounds, in which range the phosphorus compound is reacted, for example, with one mole of phosphorus pentoxide.

TABLE

| Type of compound of the phosphorus compound: | Range of the molar quantities phosphorus compound/mole $P_2O_5$ |
|---|---|
| $R'P(OR)_2$<br>‖<br>O | 0.1 to 5 moles. |
| $(R')_2POR$<br>‖<br>O | 0.2 to 9 moles. |

As solvents there may be used halogenated hydrocarbons boiling within the range of from 30° to 120° C. Chloroform, methylene chloride and 1,1,1-trichloroethane may be used with special advantage. However, the reaction may also be carried out in the presence of, for example, carbon tetrachloride, methylene bromide, symmetric and asymmetric dichloroethane, 1,1,2-trichloroethane, trichloroethylene, tetrachloroethylene, trifluorotrichloroethane and symmetric difluorotetrachloroethane and in mixtures thereof. The solvents are advantageously used in an anhydrous and non-alcholic state in amounts ranging from 1 to 300 parts by weight, preferably 7 to 50 parts by weight, per part by weight of phosphorus pentoxide. It is advantageous to carry out the reaction and the work-up with the almost complete exclusion of moisture.

The polyphosphoric ester anhydrides formed are present after the reaction either in the dissolved state or, if the reaction is carried out without a solvent, in the form of viscous oils intermingled with unreacted basic products. In the latter case it is advantageous to dissolve these oils by the addition of a solvent since solutions can be worked especially well. The solutions can be separated from the solid substance by filtering off with suction and freed from the solvent and unreacted basic phosphorus compound in vacuo or in the high vacuum at a bath temperature below 10° C. It is, moreover, possible to precipitate the dissolved polyphosphoric ester anhydrides by adding a liquid precipitating agent. The supernatant solvent containing the unreacted basic products and other impurities is discharged. This process of dissolution and precipitation may be repeated as often as desired. In this manner, undesirable impurities can be removed almost quantitatively from the polyphosphoric ester anhydrides. As precipitating agents there are suited especially low molecular weight alkanes and cycloalkanes containing 5 to 12 carbon atoms which are liquid at room temperature; there are mentioned also hexane, heptane, octane and cyclohexane. Aliphatic and cyclic ethers, for example diethyl ether, tetrahydrofurane, glycol dimethyl ether, dioxane and benzene are well suited as precipitating agents. The basic phosphorus compounds are in general sfficiently soluble in the organic solvents used as precipitating agents and are highly soluble in the solvent mixtures comprising halohydrocarbons and precipitating agents, which are formed in the precipitating process. The precipitation of dissolved polyphosphoric ester anhydrides can also be used for fractionating the products by precipitating fractions with different degrees of solubility one after the other by adding different amounts of precipitating agents. Fractions that are obtained in this manner differ from one another in respect of the catalytic activity. In this process the polyphosphoric ester anhydrides are obtained in the form of colorless to yellowish vicous oils which cannot be distilled.

The polyphosphoric ester anhydrides are mixed anhydrides of partially hydrolized polyphosphoric acid esters with partially or completely hydrolized phosphonic acid esters and/or phosphinic acid esters corresponding to the above formulae. In these mixed anhydrides there is present a mixture of open-chain, cyclic and combined open-chain/cyclic molecules with polyphosphate units which contain, statistically distributed, hydrocarbyl-substituted phosphorus atoms. The extent to which such groups are contained in the products depends primarily on the molar ratio in which the basic products are reacted with one another, however, it is also influenced by the reactivity of the phosphorus compound with respect to phosphorus pentoxide. The hydrocarbyl-susbtituted P-atom in the mixed polyphosphoric ester anhydrides can either be bonded to the polyphosphate unit through all its single bonded oxygen functions or only through part of them. In the latter case the residual P—OR groupings are preserved.

In Scheme 1 following hereunder there are shown, in a skeleton general formula, two of many possible molecule sections of polyphosphoric ester anhydrides formed in the reaction of phosphonic acid esters with $P_2O_5$. Scheme 2 represents, in a skeleton general formula, a section of one of the many reaction products that may be formed in the reaction of phosphinic acid esters with $P_2O_5$. R and R′ have the aforementioned meaning in Schemes 1 and 2.

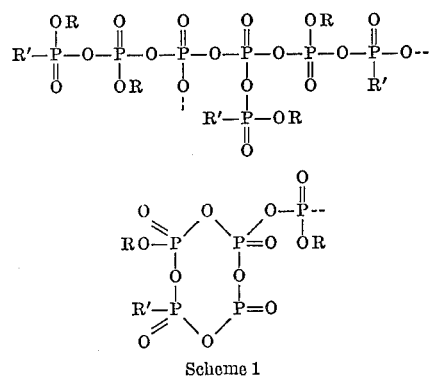

Scheme 1

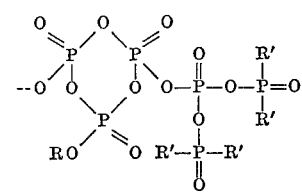

Scheme 2

The elementary composition of the polyphosphoric ester anhydrides depends on the molar ratio in which the basic components are applied, however, it depends also on the degree of conversion. Consequently, definite limits cannot be given with respect to the analytical composition of the polyphosphoric ester anhydrides that can be obtained by the process of the present invention.

As compared to the known polyphosphoric acid esters, the polyphosphoric ester anhydrides obtained according to the present invention exhibit an increased catalytic activity when used, instead of acids or Lewis acids, as catalysts in proton-catalyzed reactions.

For example, in the polymerization of 100 parts trioxane with 80 p.p.m. of a polyphosphoric ester anhydride (obtained by reacting 0.5 mole ethyl phosphonic acid diethyl ester $(C_2H_5-P(OC_2H_5)_2)$ with 1 mole $P_2O_5$), there are obtained 85 parts polytrioxane having an $\eta_{red}$ value of 1.20, while with the use of 100 p.p.m. of ethyl polyphosphate prepared from triethyl phosphate and $P_2O_5$ (molar ratio 1:1) as a catalyst, there are obtained from 100 parts trioxane 80 grams polytrioxane ($\eta_{red}$:0.9). In the copolymerization of trioxane, for example with glycol formal, the polyphosphoric ester anhydrides obtained by the process of the present invention are superior in an even higher degree to the polyphosphoric acid esters that can be obtained from phosphates and $P_2O_5$. It is possible, therefore, to operate with lower catalyst concentrations and to obtain copolymers ($\eta_{red}>1.00$) having a considerably higher molecular weight than in the case of using the known polyphosphoric acid esters as catalysts.

Moreover, the catalytic acitivity of the polyphosphoric ester anhydries can be graduated by a different content of the products of hydrocarbyl-substituted phosphorus atoms.

The polyphosphoric ester anhydrides are used as catalysts in proton-catalyzed reactions, for example in biochemical polycondensation reactions or polymerization reactions in the polyacetal field. They are, moreover, useful as intermediate products in the manufacture of insecticides.

EXAMPLE 1

9.30 grams (56 mmoles) ethyl phosphonic acid diethyl ester were added, under nitrogen, to a mixture comprising 7.97 grams (56 mmoles) phosphorous pentoxide and 35 ml. chloroform, the temperature of which had been adjusted at 0° C., and the whole was shaken thoroughly. After 10 minutes, the reaction mixture was allowed to warm up to room temperature and shaken again for 6 hours. The solution was filtered off with suction and concentrated to constant weight at 0.1 mm. Hg pressure at a bath temperature of 90° C. There remained 16.6 grams of a colorless oil having the following composition (in percent): P, 28.0; C, 23.2; H, 5.4.

EXAMPLE 2

At room temperature, 10.75 grams (67.5 mmoles) chloromethyl phosphonic acid dimethyl ester were added under nitrogen to a mixture comprising 9.60 grams (67.5 mmoles) phosphorus pentoxide and 30 ml. trichloroethylene, and the whole was shaken for 4 hours. The $P_2O_5$ was not completely converted and the reaction mixture underwent a brown discoloration. The solution was filtered off with suction from the solid substance and concentrated to constant weight as described in Example 1. There remained a brown oil having the following composition (in percent): P, 15.2; C. 15.1; H, 3.7; Cl, 14.6.

EXAMPLE 3

Under the conditions as described in Example 2, 4.6 grams (22 mmoles) 2-ethoxyethyl-phosphonic acid diethyl ester

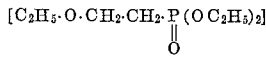

were added to a mixture comprising 6.30 grams (44 mmoles) phosphorous pentoxide and 10 ml. methylene chloride, and the whole was shaken for 5 hours. The solution was filtered off with suction from the solid substance and concentrated to constant weight at 0.1 mm. Hg pressure and at a bath temperature of 90° C. There remained a viscous oil having a faint yellow color. The oil had the following elementary composition (in percent): P, 28.4; C, 23.3; H, 4.7.

EXAMPLE 4

15.8 grams (116 mmoles) diethyl phosphinic acid methyl ester were added, under nitrogen, to a mixture comprising 8.2 grams (58 mmoles) phosphorus pentoxide and 5 ml. methylene chloride, the temperature of the mixture having been adjusted at 0° C. The reaction mixture was then stirred for 5 hours at a bath temperature of 0° C. The mixture was diluted with 10 ml. methylene chloride and the solution filtered off with suction from the residue. 60 ml. hexane were added to the filtrate whereby a colorless oil precipitated. The oil was shaken twice with a mixture comprising 10 ml. methylene chloride and 50 ml. hexane, respectively, the solvent mixture was discharged and the oil freed in vacuo (0.1 mm. Hg pressure) at room temperature from the solvent residues. The oil had the following elementary composition (in percent): P, 28.0; C, 28.4; H, 5.9.

We claim:
1. A process for the manufacture of neutral polyphosphorus ester anhydrides which comprises reacting with phosphorous pentoxide, at a temperature within the range of from −78° to +140° C., a phosphorus compound or a mixture of phosphorus compounds of the formula

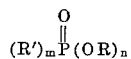

wherein $m$ and $n$ each represents the whole number 1 or 2 and the sum of $n+m$ is 3, R' represents a saturated, unsaturated, oxalkylated or chlorinated aliphatic radical containing 1 to 10 carbon atoms, and R represents a saturated or chlorinated aliphatic radical containing 1 to 5 carbon atoms, said phosphorous compound and phosphorus pentoxide being in a molar ratio of 0.01 to 20 moles:1 mole, respectively.

2. The process as claimed in claim 1, wherein the reaction is carried out in the presence of diluents and solvents at temperatures within the range of from −30° to 100° C.

3. The process as claimed in claim 1, wherein methyl-, ethyl- or chloromethyl-phosphonic acid dimethyl- or diethyl esters or mixtures of these compounds are reacted with phosphorus pentoxide.

4. The process as claimed in claim 1, wherein the phosphorus compound defined in claim 1 is reacted in a molar ratio within the range from 0.1 to 9 moles per mole of phosphorus pentoxide.

5. The process as claimed in claim 1, wherein dimethyl- or diethyl phosphinic acid methyl- or ethyl esters or mixtures of these compounds are reacted with phosphorus pentoxide.

References Cited

UNITED STATES PATENTS 2,402,703   6/1946   Woodstock _____ 260—988

CHARLES B. PARKER, *Primary Examiner.*

A. G. SUTTO, *Assistant Examiner.*

U.S. Cl. X.R.

260—67, 933, 927